Oct. 12, 1965  S. D. VIGREN ETAL  3,211,873
CONTACT SPRING ASSEMBLY FOR RELAYS AND THE LIKE
Filed March 1, 1962  4 Sheets-Sheet 1
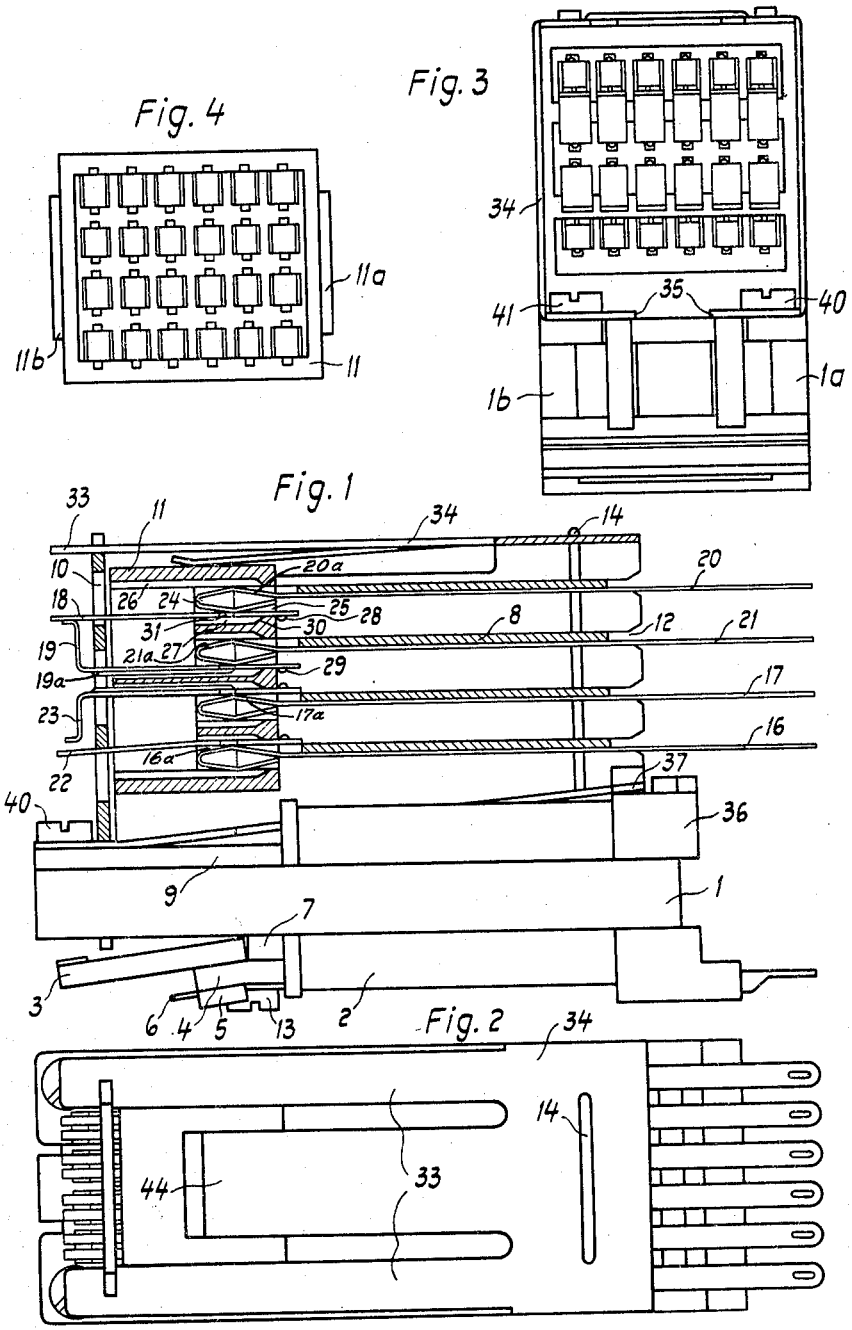
INVENTORS
Sten Daniel Vigren
BY Rolf Albin Zander
Per Harry Elias Claesson
ATTORNEYS Oct. 12, 1965  S. D. VIGREN ETAL  3,211,873
CONTACT SPRING ASSEMBLY FOR RELAYS AND THE LIKE
Filed March 1, 1962  4 Sheets-Sheet 2
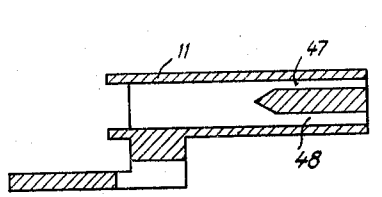
Fig. 10
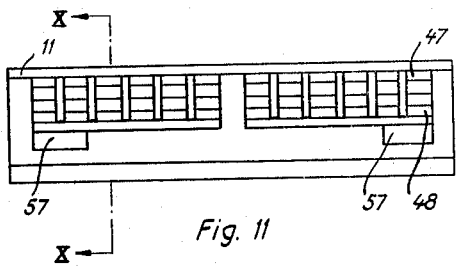
Fig. 11
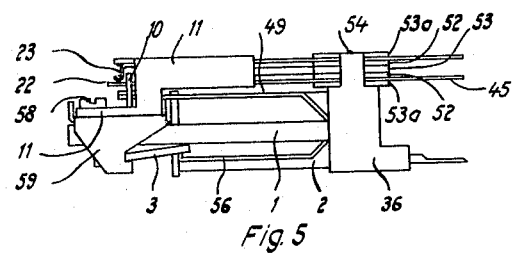
Fig. 5
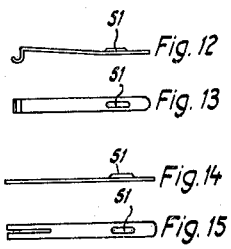
Fig. 12
Fig. 13
Fig. 14
Fig. 15
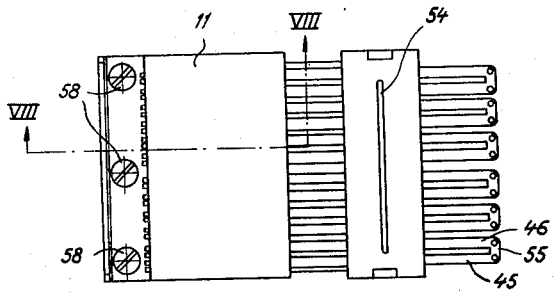
Fig. 6
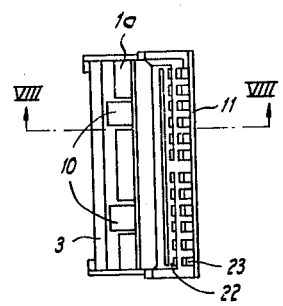
Fig. 7
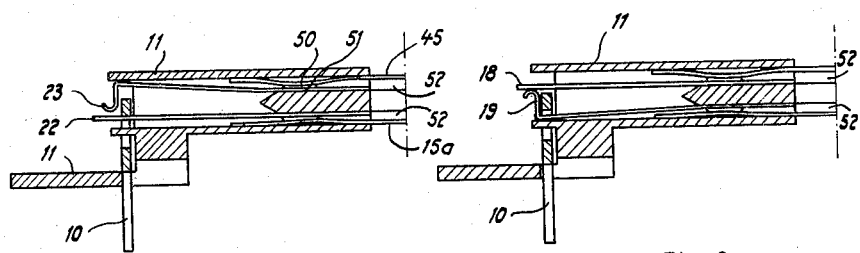
Fig. 8  Fig. 9
INVENTORS
Sten Daniel Vigren
BY Rolf Albin Zander
Per Harry Elias Claesson
Strauch, Nolen & Neale
ATTORNEYS Oct. 12, 1965 S. D. VIGREN ETAL 3,211,873
CONTACT SPRING ASSEMBLY FOR RELAYS AND THE LIKE
Filed March 1, 1962 4 Sheets-Sheet 3
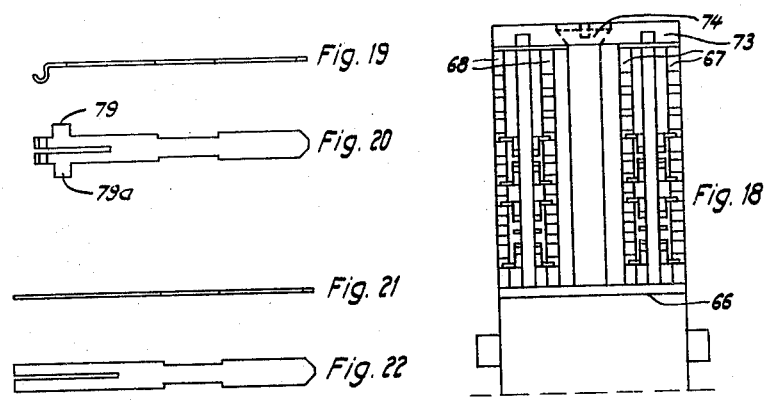
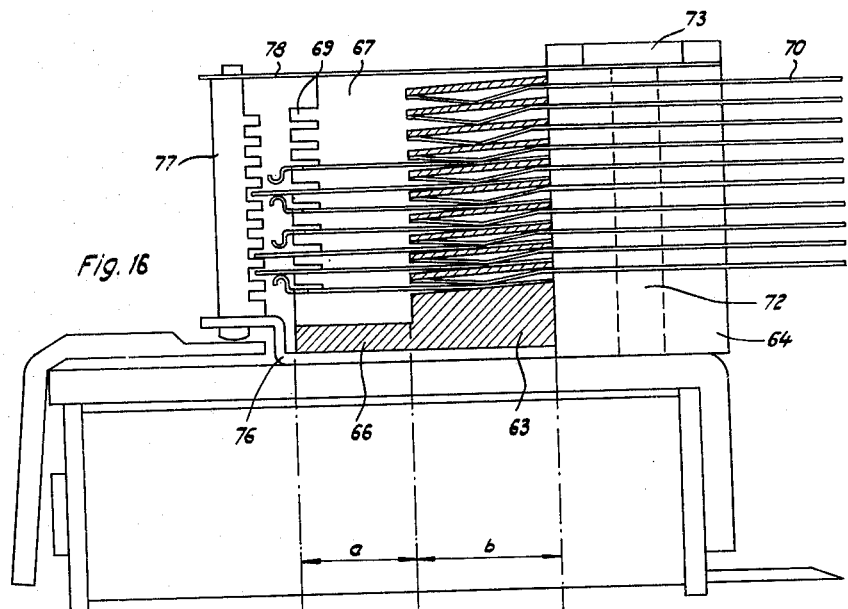
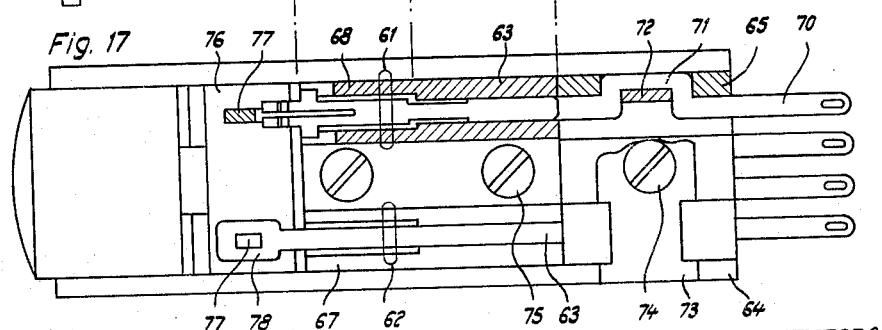
INVENTORS
Sten Daniel Vigren
BY Rolf Albin Zander
Per Harry Elias Claesson
ATTORNEYS

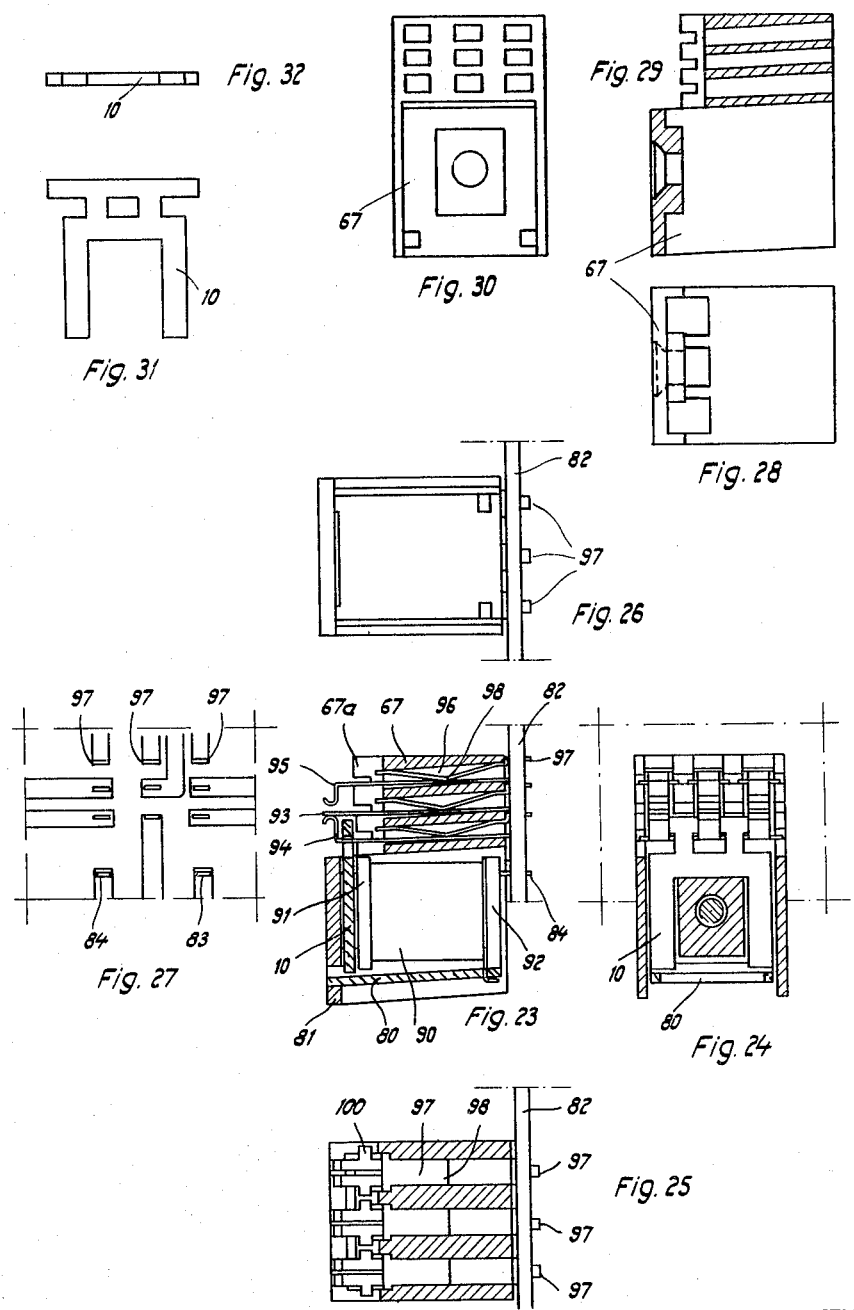

United States Patent Office 3,211,873
Patented Oct. 12, 1965

3,211,873
CONTACT SPRING ASSEMBLY FOR RELAYS
AND THE LIKE
Sten Daniel Vigren, Mosebacke Torg 16, Stockholm, Sweden; Rolf Albin Zander, Stohagsvagen 28, Alvosjo, Sweden; and Per Harry Elias Claesson, Oster Hagens Gard, Drevviken, Sweden
Filed Mar. 1, 1962, Ser. No. 177,148
Claims priority, application Sweden, Mar. 3, 1961, 2,242/61
19 Claims. (Cl. 200—166)

The present invention relates to a contact spring assembly for relays and the like, in which the contact springs are independently removable, permitting substitution of new contact springs for defective contact springs or when alteration of the contact functions is desired.

Relays employed in teletechnical engineering are mostly permanently connected, for example by soldering, and the contact points are fixed to their respective contact springs either by riveting or by welding. Substitution of contacts in such relays involves removing the relay from its circuit and physically dismounting the spring assembly. Those operations are very expensive and cannot be oft repeated because the modern connecting wire, with plastic insulation, will be damaged by repeated soldering.

The principal object of the present invention is to provide a contact, or terminal portion on a spring contact member, that is removable and can be replaced by a new contact or terminal portion while the relay remains in its operating environment. By this invention, much time and effort are saved in large switching establishments such as telephone exchanges, since the contacts may be readily replaced without disrupting the wiring in the exchange. Also, it is possible to alter the contact functions, i.e. to convert a normally open contact pair to a normally closed contact pair, by providing appropriately shaped contact wire terminal portions that are readily interchangeable.

Another object is to provide a novel terminal contact carrying portion for a contact spring that contains a bead, wart or the like which cooperates with a spring biased member to be effective to lock the terminal portion in place, but which enables the terminal portion to be removed and replaced when desired without requiring any significant disassembly of the relay.

One of the features of this invention is the simplicity and ease with which the individual contact springs may be independently exchanged for different or similar contact springs. Since the contact springs are kept in place primarily by friction forces, removal is achieved merely by pulling them out from their respective recesses in the relay bracket.

Another advantage is that the spring assembly is very simple and inexpensive to manufacture.

A further advantage is that the length of the contact springs easily can be adapted to suit different purposes without changing the fastening means and the connecting means for each spring.

Still another advantage is that the printed circuit technique can easily be adopted for making external connections to a contact spring assembly employing the invention.

A still further advantage is to provide movable contact springs having a very small inertia, which makes the contact spring assembly easy to actuate and materially diminishes contact vibrations.

Another advantage is to provide movable parts of the movable contact springs which may be very small whereby the air gaps between the contact points, when open, may be very small, without adversely affecting reliability of the contact functions.

These and other objects and advantages of the invention will be apparent from the following description, reference being had to the accompaning drawings, in which:

FIG. 1 is a side elevation, partly in section of one embodiment of the invention;
FIG. 2 is a top view of the device shown in FIG. 1;
FIG. 3 is a front end view of the same device;
FIG. 4 shows the same device viewed from the rear;
FIG. 5 is a side elevation of another embodiment of the invention;
FIG. 6 is a top view of the device according to FIG. 5;
FIG. 7 is a front end view of the same device;
FIGS. 8 and 9 are longitudinal sections of a part of the same device, showing different types of contact functions;
FIG. 10 is a longitudinal section of a bracket, used for keeping the contact springs in place in the device of FIG. 5;
FIG. 11 is a front end view of the bracket shown in FIG. 10;
FIGS. 12 and 13 are a side view and a top view, respectively, of one type of a contact spring used in the device shown in FIG. 5;
FIGS. 14 and 15 are similar views of another type of contact spring;
FIG. 16 is a side elevation, partly in section, of a further embodiment of the invention;
FIG. 17 is a top view, partly in section, of the device shown in FIG. 16;
FIG. 18 is a front end view of the same device;
FIGS. 19 and 20 are side and top elevations, respectively, of one type of springs used in the device shown in FIG. 16;
FIGS. 21 and 22 are side and top elevations, respectively, of another type of contact springs used in the same device;
FIG. 23 is a side elevation, partly in section, of still another embodiment of the invention;
FIG. 24 is a front end view, partly in section, of the device shown in FIG. 23;
FIG. 25 is a top view, partly in section, of the same device;
FIG. 26 is a bottom view illustrating the device shown in FIG. 23;
FIG. 27 is a rear view of the device according to FIG. 23, illustrating how the printed circuit technique can be used for making external connections to the contact spring assembly according to FIG. 23;
FIG. 28 illustrates a top view of the bracket 67;
FIG. 29 shows a section through said bracket in a vertical plane;
FIG. 30 illustrates the same bracket as viewed from the right end in FIG. 29;
FIG. 31 is a plan view of the insulating plate 10 shown in FIGS. 23 and 24;
FIG. 32 illustrates the same plate as shown from the bottom edge according to FIG. 31.

All the embodiments of the invention described in the following are contact spring groups used in relays, such as telephone relays and the like.

In FIGS. 1 to 4, relay-core 1 has two pole pieces 1a and 1b forming a supporting frame (FIGURE 3) around the outside of a magnetic core relay coil 2. The back end of short armature 3 is pressed against the pole pieces by an armature stop 4. Armature 3 is hinged on nylon bar 5, which is pressed against armature stop 4 by spring 6. A distance plate 7 prevents armature 3 from sticking against pole pieces 1a and 1b. Spring 6, armature stop 4 and distance plate 7 are fixed by screws 13 threaded in member 9 which is placed on the top side of the pole pieces.

The above described relay is of so-called short armature type more fully described in U.S. Patent 2,693,554, to which reference may be made for greater detailed description. Any type of relays or other magnet devices can be used for operating the instant contact spring assemblies. Even manually operated switching devices can be used for operating the contact spring assemblies without departing from the general ideas of the present invention.

The spring assembly of FIGS. 1 to 4 comprises actuator plate 10 of an insulating material, e.g. nylon, which moves vertically up and down responsive to the movement of armature 3 when energized and deenergized respectively, to thereby reposition the movable contact springs 18 and 22. Movable and stationary contact springs 18, 22 and 19, 23 are inserted through holes in plate 10 and received in recessed apertures in bracket 11 adjacent connecting rib. Bracket 11, composed of insulating material, contains twenty-four recessed apertures to receive appropriate contact springs, which create twelve arbitrarily chosen switch-functions, for example twelve make or twelve break functions, or six make and six break functions.

As shown in FIG. 1, contact springs 18 and 19 constitute a break function and contact springs 22 and 23 a make function. When actuator plate 10 is brought into motion by armature 3 movable contact springs 18 and 22 become elevated from their resting positions so that springs 18–19 become disconnected and springs 22–23 become connected. The movable springs 18 and 22 are self biased toward their stationary counter-springs.

Connecting ribs 16, 17, 20 and 21 are biased against contact springs 18, 19, 22 and 23, respectively. Six connecting ribs are fixed in each horizontal row on insulating plate 8 which acts as an auxiliary supporting means for the connecting ribs. The part of each connecting rib which constitutes the connecting point with the associated contact spring is preferably bent to eye-formed loops 16a, 17a, 20a, 21a which may be of diamond or elliptical shape or the like. The opposite end of each connecting rib, as shown in FIG. 2, constitutes a terminal portion which may be a soldering tab for permanent connection to an external circuit. For example, the eye-formed loop of rib 20 is of such a size and form, that it forcibly engages spring 18 so that the pressure between spring 18 and rib 20 is considerably greater than the contact 4 pressure between contact springs 18 and 19. Further, the eye-loop end of connecting ribs are made in such a way, that when inserted into the appropriate recessed aperture in bracket 11 create additional pressure by bearing against the opposite sides of the aperture. Naturally, the apertures in the bracket 11 and the eye-loop end of the connecting ribs can have any desired cross-sectional shape, such as circular. The eye-loop end of the connecting ribs preferably are forked in order to provide sufficient flexibility.

The apertures in bracket 11 are each provided with two slots of different length, for example, aperture 25 has long slot 26 and short slot 27. A bead such as 28 is located at one end of each contact spring to securely station it in bracket 11. Further, slot 27 provides a guide for bead 28 to facilitate ease of placement and removal of contact spring 18. Similarly, long slot 26 provides a guide for both bead 29 of stationary contact spring 19 and stiffener 19a arranged on the underside of spring 19. This stiffener in conjunction with slot 26 prevents lateral movement of stationary spring 19. Each slot terminates with convergent slope, i.e. slope 30 of slot 27, which makes the insertion and removal of the contact springs easier. The ends of the movable contact springs may be forked in order to provide twin contacts. The contact part of the stationary springs 19 and 23 can also be shaped in different ways, for example as illustrated in FIGS. 19 to 21.

The present invention features a relatively high degree of pressure between contact springs and connecting ribs. A connecting rib for example made of German silver with the dimensions 2.25 by 0.25 mm. and of 14 mm. length of the eye, gives about 500 grams spring pressure if the eye-loop of the spring is compressed from a width of 3.5 to 2.75 mm. Applied on surfaces of precious metal or German silver this is a more than sufficient contact pressure to ensure a degree of reliability equivalent to riveted contacts even where the contact voltage is only a few millivolts.

As illustrated in FIG. 1 the movable and stationary contact springs may be placed either above or below the eye-loop of the connecting ribs and accordingly they can be used either as make contacts or as break contacts. If two adjacent springs are placed below the eye-loops of the corresponding connecting ribs a break function results and if they are placed above the eye-loops a make function results. The contact springs in the embodiment shown in FIGS. 1 to 4 are indirectly operated when armature 3 is deenergized by actuator plate 10 which is urged toward its rest position by two pressure springs 33. Thus the movable contacts are disconnected from their counter contacts.

In place of eye-loops on the connecting ribs elliptically, rhombically, semi-elliptically, or semi-rhombically shaped ends may be used to provide the required pressure between the contact springs and the connecting ribs. The connecting springs may alternatively be of a zigzag-shape at the clamping portion thereof.

The contact springs and their associated plate 8 are placed in casing 34 which has a slot 35 at the bottom thereof, as shown in FIG. 3. Casing 34 also is provided with slots 12 to receive plates 8 and fixes bracket 11 in position by means of projections 11a and 11b (FIG. 4).

The insulating plates 8 are secured in the casing 34 by metal hoop 14 and the pressure springs 33 (FIG. 2), which act as a releasable locking spring 2 keep the actuator plate 10 in its rest position, form part of casing 34. Similarly pressure spring 44 of casing 34 maintains bracket 11 in its desired place.

The spring assembly is assembled in the following way. The connecting ribs 16, 17, 20 and 21, and the insulating plates 8 on which they are fixed, are inserted into the recesses in bracket 11. This in turn is inserted into casing 34 and fixed by the metal hoop 14. The movable contact springs 18 and 22 are appropriately inserted into the recesses of bracket 11 above or below the connecting springs so that beads 28 slide over slopes 30 beyond the rear of the recesses. Contact springs 18 and 22 are thereby held in position by beads 28 and by stop abutments 31 of springs 18 which engage the eye-looped ends of the connecting ribs.

Actuator plate 10 is then inserted into position for cooperation with movable contact springs 18 and 22 and finally stationary contact springs 19 and 23 are inserted through the holes in the plate 10 into their respective positions in bracket 11.

The spring assembly with casing 34 are mounted on the relay in the following way. The rims 35, at the bottom of the casing 34, are passed through slots in relay bracket 36 and are fixed to the member 9 by two fastening screws 40 and 41.

By proper shaping and locating of apertures in actuator plate 10 the contacts may be made to perform their functions early or late. By connecting two of the connecting ribs to each other, for example ribs 17 and 21, a normal change-over function is provided which also can be altered to be a make-before-break function.

The movable contact springs may be easily changed or replaced independently by merely removing the spring already in place and inserting a new one. The stationary contact springs can be changed in the same way. Because of the high incidence of wear of the contact material when operating in high-effect circuits and with high operating frequency the above mentioned independent removal and replacement of the contact spring is a very valuable feature.

In the above described embodiment the contact springs are not provided with any special contact points. Instead, because of the small dimensions thereof, the entire springs are made of a suitable contact material, such as beryllium silver alloy. Naturally, contact springs with contact points may be used with the present invention, if desired.

FIGS. 5 to 15 illustrate another embodiment of the invention, where only two horizontal rows of contact springs are placed above each other, with an arbitrarily chosen number of contact springs in each row, in this case twelve.

In this embodiment plate 10 corresponds to the plate 10 of the embodiment already described, but in the instant embodiment two separate springs 49, placed at each side of the relay coil, keep the actuator plate 10 in its rest position. The rear ends of springs 49 are fixed at the bracket 36, and the forward end of the springs penetrate holes 57 (FIG. 11) in the bracket 11, and extend to the actuator plate 10.

Bracket 11, as best shown in FIGS. 10 and 11, has two rows of 12 apertures each, designated apertures 47 and 48, which receive contact springs 23 and 22, respectively. In this embodiment ribs 45 and 46, 45 and 45a (FIG. 8), are bent at one end into the form of a bow 50, in order to obtain the necessary pressure to properly engage contact springs 22 and 23. Adequate, stable connection between contact springs 22 and 23 and ribs 45 and 46 is further insured by crest shaped ridges 51 integral with springs 22 and 23, FIGS. 12 to 15 which are designed to mate with bows 50. Movable contact springs 22 are a little broader at ridges 51 to prevent lateral movement.

Each connecting rib is riveted to a sheet 52, of insulating material preferably phenolic resin material such as Bakelite, which provides a support for the free part of the springs, and prevents the movable contact springs from being pushed too far into the holes in bracket 11. Other insulating sheets 53, placed between the connecting ribs properly space the ribs from each other.

Sheets 53 are extended to the back of the bracket 11 and small sheets 53a, of a suitable insulating material, are placed between bracket 36 and the bottom of lower connecting ribs and on top of the upper connecting ribs.

Insulating sheets 52, 53 and 53a are fastened to the bracket 36 for example by a wire strap or a hoop 54 which is pressed through holes in the bracket 36.

As illustrated in FIG. 6 connecting ribs 45 and 46 are connected together in pairs by a link member 55. If spring 45 represents a make function and the spring 46 a break function, those two springs together with corresponding springs in an adjacent level will constitute a change-over function, if the link between the connecting springs in one level is cut open. If the links in both levels are cut open, two make functions (FIG. 8) or two break functions (FIGS. 9) are obtained.

Because the contact springs have small dimensions (small inertia as compared to the contact pressure), the contacts operate without vibration. Suitable dimensions are:

Length—25 mm.
Width—2.5 mm.
Thickness—0.2 mm.

As material for the contact springs hard rolled silver alloy, containing a small quantity of copper and beryllium, can be used, for example 10% copper, 1% beryllium and 89% silver.

The above described contact devices need very little space. FIGS. 12–15 are illustrating typical contact springs at their natural size, while the bracket 11, FIGS. 10 and 11, is illustrated on the scale 2:1.

The magnet circuit is of short-armature-type like that described in the embodiment of FIGS. 1–4. The armature 3 of FIGS. 5 to 15 is kept in place by two springs 56, one at each side of the coil, which are hooked in holes in the rear end of the armature so as to press the rear of the armature against the pole pieces, which are of a magnetic material. The air-gap between the free end of the armature and the pole pieces is determined by two wings 59 of diamagnetic material, for example brass, which are fastened to the pole pieces by fastening screws 58 (FIGS. 5 and 6). The bracket 11 is also fastened by the same screws.

Another embodiment of the invention will now be described with reference to FIGS. 16 to 22. In this embodiment the invention is applied to a relay having an angle bent armature and of the so-called Kellog-type, which is so well known that a detailed description here is deemed not necessary. The bracket as disclosed in these figures is divided into a front part comprising base 63 and sidewalls 66 and 67 and a rear part comprising rear bracket members 64 and 65.

The make contacts in this embodiment are of so called direct operated type which will be apparent from the following description. The spring assembly is made easily mountable on existing teletechnical equipment, for example in telephone exchanges. It is possible, depending on the contact vibrations, to substitute already existing spring assemblies in a very simple way, where such substitution is desirable, for example because of contact wear.

The two spring assemblies 61 and 62 are fastened by means of bracket members 66, 67 and 68. The contact springs and the connecting ribs are inserted into holes or recesses in the apertured member 63 of base bracket 66 in such a way that they are pressed together in the manner described above. Side brackets 67 and 68 preferably molded from an insulating plastic material such as nylon, are integral with base bracket 66, and project upwards at right angles therefrom. Along the distance a (FIG. 16) side brackets 67 and 68 have two walls with teeth 69 and along the distance b have holes in which the contact springs and the connecting ribs are pressed against each other. Rear brackets 64 and 65 are provided with slots into which the connecting ribs are inserted from one side. The connecting ribs are shaped in the form of a U as illustrated at 71 for spring 70. The ribs are also fixed by means of an insulating strip 72, which is inserted after the springs have been put into place.

The rear brackets 64 and 65 are fastened by fastening screws to the relay bridge or to a special metal sheet which can be fixed to the relay bridge by plate 73 and screw 74. Apertured member 63 and plate 76 are fastened to the plate 73 or to the relay bridge by fastening screw 75. Plate 76 has a hole for guiding the actuator plates 77, which actuate the movable contact springs. At the top side of the relay the actuator plates 77 are inserted into holes in a spring 78, which is fastened to the rear brackets 64 and 65.

FIGS. 21 and 22 illustrate a movable contact spring and FIGS. 19 and 20 a stationary contact spring which may be used in this embodiment of the invention. The stationary contact springs are provided with projections 79, 79a, which are pressed against the teeth 69 of the said brackets 67, 68. When the movable contact springs are elevated by movement of plate 77, the contacts are brought into function, for example make, break, and/or change-over functions as illustrated in FIG. 17. As in above described embodiments it is important that the inertia of the movable contact springs is small compared with the contact pressure.

In the embodiment according to FIGS. 23 to 32, 80 designates a relay armature which is actuated by relay coil 90 with pole pieces 91 and 92, as best seen in FIG. 23. Actuator plate 10 is adapted to be actuated by the armature 80 and upon such actuation to be displaced upwards. The plate 10, best illustrated in FIGS. 24, 31 and 32, actuates movable contact springs 93. The movable contact springs 93 as well as stationary contact springs 94 and 95 are inserted in holes or recesses 96 in insulating bracket 67 separately illustrated in FIGS. 28 to 30. Connecting ribs 97 (FIGS. 23, 25, 26 and 27) are also inserted in said recesses. Each of said connecting ribs 97 is bent to have a crest 98 which is pressed against one of the contact springs in order to clamp the springs in place and to make contact therewith. Each connecting rib 97 is of T-shape as illustrated in FIG. 25, and the head of the T is located in an enlargement of the recess 96 in order to keep the connecting rib in place. Each connecting rib 97 is inserted from the front end (the left end according to FIG. 23) of the insulating bracket 67. The rear end of each connecting rib penetrates an insulating sheet 82 which is a base for a printed circuit, the conducting elements of which are illustrated in FIG. 27. Only a part of said printed circuit is shown but it will be evident to anyone skilled in the art that the conductors of the printed circuit may be used for connecting the connecting ribs 97 to any desired points of an external circuit.

Each of the contact springs 93 to 95 is provided with side projections 100 (FIG. 25) which are biased against teeth 67a of the insulating bracket 67, in order to provide well defined rest positions for the contact portions of said contact springs.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In an electromagnetic relay: a supporting frame; a magnetizable core fixed to said supporting frame; a movable armature pivoted to said supporting frame; a plurality of movable contact springs adapted to be actuated by said armature; a number of fixed contact springs with which said movable contact springs are adapted to cooperate, each of said fixed and movable contact springs being substantially straight and having a contact end to selectively engage a corresponding contact end of an adjacent selectively cooperating spring and a clamping end; a connection rib associated with the clamping end of each of said contact springs; an insulating bracket means for clamping the clamping end of each said contact spring to its associated connection rib, said bracket means fixed to said supporting frame and having an aperture for the clamping end of each spring and its associated connection rib; and spring means for holding the associated spring clamping end and said rib in contact with each other in said aperture.

2. In an electromagnetic relay: a supporting frame; a magnetizable core fixed to said supporting frame; a movable armature pivoted on said supporting frame; a plurality of movable contact springs adapted to be actuated by said armature upon an alternation of the magnetical condition of said magnetizable core; a number of fixed contact springs adapted to cooperate with said movable contact springs upon actuation of the latter, each of said fixed and movable contact springs being substantially straight and having a contact end to selectively engage a corresponding contact end of an adjacent selectively cooperating spring and a clamping end, the clamping end of each of said contact springs having a connection rib associated therewith; an insulating bracket for holding the clamping end of said springs fixed relative to said frame, said bracket fastened to said frame and being provided with apertures to receive the clamping end of each spring and its associated rib, the clamping end of each of said springs inserted in one of said apertures from one side of said bracket and the corresponding connection rib inserted in the same aperture from the other side of said bracket, said apertures being disposed in uni-linear stacked relation whereby each said movable contact spring is substantially parallel to the fixed contact spring with which it cooperates, but spaced therefrom in a direction substantially perpendicular to the planes containing said contact springs.

3. In an electromagnetic relay: a supporting frame; a bracket secured to said supporting frame; a magnetizable core fastened to said supporting frame; a movable armature pivoted to said supporting frame; a plurality of fixed contact springs; a number of movable contact springs adapted to be actuated by said armature upon magnetization of said core and to cooperate with said fixed contact springs, each of said fixed and movable contact spring members being substantially straight and elongated and having a contact zone at one end to selectively engage a corresponding contact zone of an adjacent selectively cooperating spring member and a clamping zone at the other end thereof; said fixed and movable springs fastened relative to said supporting frame by means of said bracket; said bracket connected to said supporting frame having linearly aligned apertures therein to receive said cooperating springs, each of said springs positioned in one of said apertures from one side of said bracket; a plurality of connection ribs, each one of said connection ribs associated with one of said contact springs, each of said connection ribs positioned in the same aperture of said bracket as the contact spring with which it is associated but extending from the opposite side of said bracket from the extending portion of said contact spring; each of said associated contact springs and ribs held in place and in contact with each other in said aperture by resilient spring means; means for transferring movement from said armature to said movable contact springs comprising an insulating plate having one surface for cooperating with said armature and a separate surface for cooperating with each of said movable contact springs; and a releasable locking spring for maintaining said movement transferring means in position.

4. In an electromagnetic relay: a supporting frame; a magnetizable core fixed to said supporting frame; a movable armature pivoted to said supporting frame; a plurality of movable contact springs adapted to be actuated by said armature; a plurality of fixed contact springs adapted to cooperate with said movable contact springs; a bracket mounted on said supporting frame for keeping one end of each of said springs secured relative to said supporting frame, said bracket having a number of linearly aligned apertures therein to receive said springs; said apertures corresponding to the number of springs; each spring inserted into a first opening in one aperture of said bracket from one side thereof; a number of connection ribs corresponding to the number of contact springs, each rib inserted into a second opening in one aperture of said bracket from the side opposite said one side, resilient spring means associated with each of said connection ribs, each resilient spring means inserted into one of the apertures and adapted to press the connection rib and the contact spring together toward one wall of said aperture; and each of said contact springs having a bead-like projection, said projection cooperating with an edge of the wall of said aperture to thereby lock said spring in position against inadvertent displacement.

5. The electromagnetic relay as claimed in claim 3, wherein said contact springs have stop abutments, said abutments cooperating with a corresponding abutment in said aperture for defining the position of said spring in said aperture when inserted therein.

6. In an electromgnetic relay having a supporting frame, a magnetizable core secured to said supporting frame, a movable armature pivoted to said supporting frame, the improvement comprising: a plurality of movable contact springs adapted to be actuated by said armature, a plurality of fixed contact springs adapted to cooperate with said movable contact springs, a bracket mounted on said supporting frame for keeping one end of said springs secured relative to said supporting frame, said bracket having a number of apertures therein corresponding to the number of springs, each spring positioned from one side into one aperture of said bracket so as to be independently removable and projecting therefrom at one side thereof, a number of connection ribs, at least one rib positioned in each one of said apertures in said bracket and projecting therefrom at the side opposite from said springs, resilient means associated with each one of said connection ribs in each aperture and adapted to press the associated connection rib and the contact spring together toward one wall of said aperture, auxiliary supporting means projecting from said bracket in the same direction as said connection ribs to support all the projecting ends of a group of said connection ribs.

7. The relay as claimed in claim 6 wherein said connection ribs are arranged in a series of groups with each group located in one plane, and said groups located in different planes parallel to each other.

8. In an electromagnetic relay as claimed in claim 7, two auxiliary bracket means projecting from the sides of said bracket with apertures therein, said auxiliary bracket means having the form of sheets which project in the same direction as said connection ribs and support said groups of said connection ribs.

9. In an electromagnetic relay: a supporting frame; a magnetizable core secured to said supporting frame; a movable armature pivoted to said supporting frame; a plurality of movable contact springs; said armature actuating said movable contact springs; a plurality of fixed contact springs; said movable contact springs engaging said fixed contact springs; a bracket connected to said supporting frame for keeping one end of said springs secured relative to said supporting frame; said bracket having a number of apertures therein corresponding to the number of springs; each spring positioned in one aperture of said bracket and projecting therefrom at one side thereof; a number of connection ribs corresponding to the number of contact springs, each rib positioned in one of said apertures in said bracket and projecting therefrom at the opposite side from said springs; a number of resilient spring means associated with said connection ribs and said contact springs, each resilient spring means inserted in one of said apertures and exerting a force against said contact spring and said connection rib to bias them into firm engagement toward one wall of said aperture, the walls of said apertures having a rear part and a front part, said rear part surrounding only a part of connection rib and said front part another part of said connection rib as well as a part of a contact spring.

10. The electromagnetic relay as claimed in claim 9, wherein said bracket is divided into two parts, one of said parts comprising said front parts of the walls of said apertures and the other of said parts comprising the rear parts of the walls of said apertures.

11. The electromagnetic relay as claimed in claim 9, wherein said bracket is divided into one forward part and one rearward part, said forward part comprising said front parts of the walls of said apertures and said rearward part comprising said rear parts of the walls of said apertures, said forward part having projecting support members for supporting and projecting ends of said contact springs.

12. The electromagnetic relay as claimed in claim 9, wherein said bracket is divided into one forward part and one rearward part, said rearward part having a substantially greater extension in the direction of said apertures than said forward part.

13. The electromagnetic relay as claimed in claim 9, wherein said contact springs have contact means at the projecting ends thereof, said connection ribs having connecting portions at the projecting ends thereof, the distance between the connecting portion and the portion engaging a contact spring of each connection rib being considerably greater than the distance between the contact means and the portion engaging a connection rib of each contact spring.

14. In a switching device having open accessible contact spring members in the installed position including: a plurality of separate, movable contact spring members; a plurality of separate, fixed contact spring members with which said movable contact spring members are adapted to selectively cooperate, each of said fixed and movable contact spring members being substantially straight and elongated, and having a contact zone at one end to selectively engage a corresponding contact zone of an adjacent selectively cooperating spring member and a clamping zone at the other end; a connection rib of conductive material associated with each said spring members and having one end portion thereof in engagement with the clamping zone of said associated spring member; and a bracket member of insulation material having an aperture for each connection rib and associated spring member with walls that firmly receive the clamping zone of said spring member and engaging end portion of said connection rib in a manner enabling each of said movable and fixed spring members to be independently and individually removed by exerting a pull on the contact zone of such spring member and new members may be substituted therefor by pushing such new member into said aperture.

15. In a switching device having open accessible contact spring members in the installed position including: a plurality of separate, movable contact spring members; a plurality of separate, fixed contact spring members with which said movable contact spring members are adapted to selectively cooperate; each of said fixed and movable contact spring members being substantially straight and elongated, and having a contact zone at one end to selectively engage a corresponding contact zone of an adjacent selectively cooperating spring member, and a clamping zone at the other end thereof; a connection rib of conductive material associated with each of said spring members and having one end portion thereof in engagement with the clamping zone of said associated spring member; and a bracket member of insulation material having an aperture for each connection rib and associated spring member with walls that firmly receive the clamping zone of said spring member and the engaging end portion of said connection rib in a manner enabling each of said movable and fixed spring members to be independently and individually removed by exerting a pull on the contact zone of such spring and new members to be substituted therefor by pushing such spring member into said aperture; said apertures disposed in unilinear stacked relation whereby each of said movable contact spring members is substantially parallel to the fixed contact spring member with which it is cooperating, but spaced therefrom in a direction substantially perpendicular to the planes of said contact spring members.

16. A switching device as defined in claim 14 including spring means in each of said apertures for resiliently clamping the clamping zone of the related contact spring member to the engaging end portion of the associated connection rib.

17. A switching device as defined in claim 14 wherein the engaging end portion of each connection rib is bent to provide a resilient spring means which clamps the associated clamping zone of the contact spring member against one wall of said aperture.

18. A switching device as defined in claim 14 wherein the engaging end portion of each connection rib is elliptically bent to provide a resilient spring means which clamps the associated clamping zone of the contact spring member against one wall of said aperture.

19. In an electromagnetic relay having a supporting frame, a magnetizable core secured to said supporting frame, a movable armature pivoted to said supporting frame, the improvement comprising: a plurality of movable contact springs adapted to be actuated by said armature; a plurality of fixed contact springs adapted to cooperate with said movable contact springs; a bracket mounted on said supporting frame for keeping one end of said springs secured relative to said supporting frame, said bracket having a number of apertures therein corresponding to the number of springs, each spring positioned from one side into one of said bracket apertures so as to be independently removable and projecting therefrom at one side thereof; a number of connection ribs, at least one rib positioned in each one of said apertures in said bracket and projecting therefrom at the side opposite from said springs; resilient means in said apertures and adapted to press the associated connection rib and the contact spring together toward one wall of said apertures; and a printed circuit disposed at the projecting ends of said connection ribs, each rib connected to a conductor of said printed circuit, all of such conductors leading to terminals at the sides of an insulating sheet on which said circuit is printed.

References Cited by the Examiner

UNITED STATES PATENTS

| | | | |
|---|---|---|---|
| 2,237,274 | 4/41 | Hailes | 200—166 |
| 2,738,400 | 3/56 | Hailes | 200—166 |
| 2,769,881 | 11/56 | Hailes | 200—166 |
| 2,856,492 | 10/58 | Heyhal | 200—166 |

FOREIGN PATENTS

| | | |
|---|---|---|
| 209,663 | 7/57 | Australia. |
| 229,766 | 8/60 | Australia. |

BERNARD A. GILHEANY, *Primary Examiner.*

ROBERT K. SCHAEFER, *Examiner.*